Patented Oct. 9, 1945

2,386,389

UNITED STATES PATENT OFFICE 2,386,389

PRODUCTION OF CALCIUM AND MAGNESIUM COMPOUNDS FROM DOLOMITE

Frank Elkington, Sheffield, and Heinz Henry Chesny, Worksop, England; said Elkington assignor to said Chesny No Drawing. Application February 24, 1941, Serial No. 380,088. In Great Britain June 6, 1939

5 Claims. (Cl. 23—67)

This invention is for improvements in or relating to the production of calcium and magnesium compounds from dolomite.

It is known to obtain calcium and magnesium carbonates from dolomite by passing gases containing a high percentage of carbon dioxide under relatively high pressure into a dilute slurry of calcined and slaked dolomite. By this means the magnesium hydroxide is converted to soluble magnesium bicarbonate from which magnesium basic carbonate is recovered by boiling. This process is, however, relatively expensive.

In an alternative process a slurry of dolomitic hydroxides is treated with a brine, such as sea water, containing magnesium salts in order to obtain magnesium hydroxide by interaction of the calcium hydroxide with convertible magnesium salts contained in the brine. The magnesium hydroxide can subsequently be converted into oxide by calcination or into carbonate or basic carbonate by treatment with gases containing carbon dioxide.

It is an object of the present invention to provide a simple and economical process of manufacturing calcium and magnesium compounds from dolomite without requiring the use of brine containing magnesium salts.

We have found that under certain circumstances magnesium carbonate and calcium carbonate may be formed from calcined and slaked dolomite in crystals or aggregates of such widely differing size that mechanical separation of the two compounds from one another may be readily carried out.

The present invention comprises a process for the preparation of magnesium and calcium compounds from dolomite which includes the steps of calcining the dolomite to convert substantially all the carbonates to oxides while avoiding the dead-burning of the oxides, slaking the oxides to form a concentrated slurry of the corresponding hydroxides, treating the slurry with a gas containing carbon dioxide and separating the magnesium carbonate from the calcium carbonate by screening, hydraulic classification or the like.

In order to obtain the necessary difference in the size of the magnesium carbonate crystals and those of the calcium carbonate, it is important that the conditions of carbonation are properly controlled. We have found that the temperature at which the carbonation is carried out is of particular importance, and that this temperature should be maintained so as to not exceed 20° C., and preferably it should be maintained at 16° to 18° C. The source of carbon dioxide may be a dilute gaseous mixture containing preferably not over 20% by volume of carbon dioxide. Gas containing 10% carbon dioxide by volume has given good results. It is of importance that the partial pressure of carbon dioxide shall be sufficiently low to permit the formation of large, well formed, similar crystals and aggregates of magnesium carbonate. At the same time it is essential to avoid the formation of magnesium bicarbonate. For this reason, when using the carbon dioxide gas issuing from the kiln in which the dolomite rock is calcined in the first step of this process, it is necessary to dilute this gas as hereinafter more fully described.

In order to obtain widely different crystal sizes of magnesium and calcium carbonates, it is desirable to carefully control the calcination and the slaking of the dolomite. The dolomite rock must be calcined under conditions insuring uniform decomposition. It must be heated while being agitated at a uniform temperature and for a sufficient length of time to drive off substantially all carbon dioxide. The calcining step of the process should be carried out at a relatively low temperature and for a relatively long time in order to form a reactive quicklime, which will slake to form finely divided calcium and magnesium hydroxides. We have found that for most dolomite rocks a suitable temperature is 900° to 1150° C. In order to facilitate the completeness of calcination at the low temperature employed, we prefer to permit a stream of air to pass through the kiln so as to remove and sweep out the carbon dioxide and thereby to obtain a relatively low partial pressure within the calcining zone of the kiln.

If the waste gases from the calcining step are not used as a source of carbon dioxide, it is possible, of course, to employ, for example, boiler flue gas which has been cooled and freed from solid impurities by scrubbing. Such a gas may contain an amount of carbon dioxide of the order of 9 to 12% by volume.

The slaking of the calcined dolomite should be carried out with relatively hot water and preferably at a temperature of approximately 90° C. Although the calcined dolomite prepared under the conditions as outlined will slake relatively fast, it is essential for the success of the following process steps that the slaking operation be carried out for a time of not less than one and preferably one and one-half hours, to insure complete conversion of the oxides to hydroxides.

It is preferable, but not essential, that the slaked dolomite slurry be passed through a screen to remove any over-sized solids which may be present and which, if not removed at this point, would be separated out with the magnesium carbonate to be formed later.

Subsequent to the slaking operation the slurry must be cooled prior to contacting with the carbon dioxide gas.

The carbonating step of the process may be carried out advantageously in relatively shallow vessels, so that the difference in partial pressure of carbon dioxide near the bottom and near the top of the liquid shall be relatively small. The carbonation is carried out up to the point where magnesium normal carbonate and calcium carbonate have replaced the hydroxides.

Upon completion of the carbonation, the slurry, which now contains large crystals of magnesium carbonate and small crystals of calcium carbonate is subjected to mechanical separation. Particularly good results are obtained when passing the slurry through a 100 mesh screen, but it is possible also to subject the slurry to hydraulic classification, in which case the magnesium carbonate is removed at the bottom of the classifier, while the calcium carbonate concentrates in the overflow.

Although satisfactory separation of the calcium and magnesium carbonates is obtained in the manner described, we have found it advantageous to carry out the mechanical separating while the slurry is kept in contact with a gaseous atmosphere containing carbon dioxide at a partial pressure substantially equal to that prevailing during the carbonating step. This precaution inhibits a decomposition of the magnesium carbonate, which decomposition would cause a formation of some small crystals which would contaminate the calcium carbonate, accompanied by a corresponding loss of magnesium carbonate. For the same reason we find it desirable to maintain the temperature of the slurry during the mechanical separation equal to that prevailing during the carbonating step of the process.

Having separated the magnesium carbonate from the calcium carbonate we may calcine the former to produce magnesium oxide. According to the conditions of calcination we may thus form a caustic magnesium oxide such as is used for various pharmaceutical and chemical applications, as well as for the production of magnesia cements, or we may calcine the material under other conditions resulting in the formation of a dead-burnt magnesium oxide.

We have found that our invention may be applied to particular advantage in the production of magnesium basic carbonate, such as is used extensively as magnesia insulation (pipe covering) and for many other chemical and pharmaceutical purposes, or for use as filler, coating agent, etc. To produce magnesium basic carbonate we may subject the crystals of magnesium carbonate, which we have separated out as described above, to the action of heat. By this means we are able in one operation to form the magnesium basic carbonate, and at the same time to dry this compound.

In order to form a particularly light and fluffy magnesium basic carbonate we may utilize a portion of the clear liquor which is decanted from the calcium carbonate. This liquor we add to the magnesium carbonate crystals, thereby forming a relatively dilute slurry which we then heat gradually to a temperature between 75 and 95° C. Decomposition of the magnesium carbonate takes place and magnesium basic carbonate is formed. The latter may then be dried.

It shall be understood that the term dolomite, as used herein, includes also dolomitic limestones, and generally materials containing substantial amounts of calcium and magnesium carbonates.

While we have described the preferred method of carrying out my invention, it will be understood that we do not intend to be specifically limited thereto and that our invention can be otherwise practiced within the scope of the appended claims.

We claim:

1. The process of producing calcium and magnesium compounds from dolomite which comprises the steps of calcining the material to convert the magnesium and calcium carbonates to oxides, slaking the oxides to form a concentrated slurry and for a sufficient period of time to insure substantially complete conversion of the oxides to hydroxides, treating the slurry with carbon dioxide while maintaining it at a temperature of about 20° C., and thereafter mechanically separating the magnesium carbonate crystals from the calcium carbonate crystals in an atmosphere containing substantial amounts of carbon dioxide substantially equal to that prevailing during the carbonating step.

2. The process of producing calcium and magnesium compounds from dolomite which comprises the steps of calcining the material while agitating it to convert the magnesium and calcium carbonates to oxides and to drive off substantially all carbon dioxide, slaking the oxides for a sufficient period of time to insure substantially complete conversion of the oxides to hydroxides and to form a concentrated slurry, contacting the slurry with carbon dioxide while maintaining the slurry at a temperature of approximately 20° C. or lower, and thereafter mechanically separating the magnesium carbonate crystals from the calcium carbonate crystals while contacting the material with an atmosphere containing carbon dioxide having substantially the same partial pressure as that prevailing in the carbonation step.

3. The process of producing calcium and magnesium compounds from dolomite which comprises the steps of calcining the material in a kiln to convert the calcium and magnesium carbonates to oxides, reducing the partial pressure of carbon dioxide in the kiln by passing a stream of air through it during the calcining operation, slaking the oxides for a sufficient period of time to insure substantially complete conversion of the oxides to hydroxides, treating the slurry with carbon dioxide while maintaining the temperature of the slurry at approximately 20° C. or lower, and thereafter mechanically separating the magnesium carbonate crystals from the calcium carbonate crystals while maintaining it in an atmosphere of carbon dioxide having substantially the same partial pressure as that prevailing in the carbonation step.

4. The process of producing calcium and magnesium compounds from dolomite which comprises the steps of calcining the material to convert the magnesium and calcium carbonates to oxides while agitating the material and maintaining a relatively low partial pressure in the calcining zone, slaking the oxides to form a concentrated slurry, contacting the slurry with an atmosphere of carbon dioxide while maintaining a relatively low partial pressure in the carbonation zone and while maintaining the slurry at a temperature of 20° C. or lower, and thereafter separating the magnesium carbonate crystals from the calcium carbonate crystals by mechanical separation while maintaining the material in contact with an atmosphere of carbon dioxide having substantially the same partial pressure as that prevailing in the carbonation step.

5. The process of producing calcium and magnesium compounds from dolomite which comprises the steps of calcining the material for a sufficient period of time to convert the calcium and magnesium carbonates to oxides and to expel substantially all carbon dioxide therefrom, slaking the oxides to form a concentrated slurry, treating the slurry while maintaining it at a temperature below approximately 20° C. in an atmosphere of carbon dioxide until substantially all of the hydroxides are converted to carbonates, and thereafter mechanically separating the magnesium carbonate crystals from the calcium carbonate crystals while maintaining the material in contact with carbon dioxide, the partial pressure of the carbon dioxide being substantially the same as the partial pressure prevailing in the carbonation step.

FRANK ELKINGTON.
HEINZ HENRY CHESNY.